US010260451B2

United States Patent
Ikai et al.

(10) Patent No.: US 10,260,451 B2
(45) Date of Patent: Apr. 16, 2019

(54) HEAT INSULATION STRUCTURE OF COMBUSTION CHAMBER OF ENGINE

(71) Applicant: MAZDA MOTOR CORPORATION, Aki-gun, Hiroshima (JP)

(72) Inventors: Takashi Ikai, Higashihiroshima (JP); Osamu Aoki, Higashihiroshima (JP); Kazuo Ichikawa, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 37 days.

(21) Appl. No.: 15/514,819

(22) PCT Filed: Sep. 26, 2016

(86) PCT No.: PCT/JP2016/078227
§ 371 (c)(1),
(2) Date: Mar. 27, 2017

(87) PCT Pub. No.: WO2017/057250
PCT Pub. Date: Apr. 6, 2017

(65) Prior Publication Data
US 2017/0328300 A1    Nov. 16, 2017

(30) Foreign Application Priority Data

Sep. 30, 2015    (JP) .................................. 2015-194263

(51) Int. Cl.
*F02F 3/12* (2006.01)
*F16J 1/01* (2006.01)
(Continued)

(52) U.S. Cl.
CPC .............. *F02F 3/12* (2013.01); *F02F 3/0084* (2013.01); *F16J 1/01* (2013.01); *F02B 23/105* (2013.01);
(Continued)

(58) Field of Classification Search
CPC .............. F02F 3/12; F02F 3/0084; F16J 1/01
See application file for complete search history.

(56) References Cited

U.S. PATENT DOCUMENTS 4,711,208 A * 12/1987 Sander ................ F02B 23/0603
123/271
2005/0025952 A1 * 2/2005 Field ...................... B32B 27/04
428/304.4

FOREIGN PATENT DOCUMENTS

JP    2001263158 A    9/2001
JP    2008260876 A    10/2008
(Continued)

OTHER PUBLICATIONS

ISA Japan Patent Office, International Search Report and Written Opinion Issued in Application No. PCT/JP2016/078227, dated Nov. 29, 2016, WIPO, 11 pages.

*Primary Examiner* — Jacob M Amick
(74) *Attorney, Agent, or Firm* — Alleman Hall Creasman & Tuttle LLP

(57) ABSTRACT

An object of the present invention is to, while forming a heat insulating layer on a squish area surface of a top surface of a piston main body, prevent generation of large cracks on the heat insulating layer and suppress damages and peeling of the heat insulating layer. To achieve this object, in the present invention, a heat insulating layer on a squish area surface of a top surface of a piston main body is made thinner than a heat insulating layer on a cavity surface of the top surface of the piston main body.

16 Claims, 3 Drawing Sheets

(51) Int. Cl.
*F02F 3/00* (2006.01)
*F02F 1/00* (2006.01)
*F02B 23/10* (2006.01)

(52) U.S. Cl.
CPC ... *F02F 2001/008* (2013.01); *F05C 2251/048* (2013.01)

(56) References Cited

FOREIGN PATENT DOCUMENTS

| | | |
|---|---|---|
| JP | 2009121425 A | 6/2009 |
| JP | 201055703 A | 3/2010 |
| JP | 2011169232 A | 1/2011 |
| JP | 201581527 A | 4/2015 |

* cited by examiner

HEAT INSULATION STRUCTURE OF COMBUSTION CHAMBER OF ENGINE

TECHNICAL FIELD

The present invention relates to a heat insulation structure of a combustion chamber of an engine.

BACKGROUND ART

Conventionally, in the case of a metal product, such as an engine part, which is subjected to a high-temperature gas, a heat insulating layer is formed on a surface of a metal base material of the metal product to suppress heat transfer from the high-temperature gas to the metal product, that is, to suppress a cooling loss of the metal product. One known example is that a heat insulating layer made of an inorganic oxide (such as zirconia) or an organic material containing hollow particles is formed on a top surface of a piston main body that defines a combustion chamber of an engine.

A squish area may be formed at a gap portion between the top surface of the piston main body that defines the combustion chamber and a lower surface of a cylinder head. In a case where the heat insulating layer is provided on a surface (squish area surface), where the squish area is formed, of the top surface of the piston main body, the heat insulating layer becomes high in temperature, and therefore, the squish area surface itself becomes high in temperature. On this account, when a high temperature and high pressure end gas (an uncombusted air-fuel mixture existing far from a spark plug) flows to the squish area in a combustion process, heat radiation from the end gas to the squish area surface is inhibited by the high temperature squish area surface, and this may cause knocking. Then, cracks are generated on the heat insulating layer formed on the squish area surface, and this causes damages and peeling of the heat insulating layer. Thus, a heat insulation property of the heat insulating layer is lost.

Some references (see PTL 1, for example) describe an internal combustion engine in which the heat insulating layer is not formed on the squish area surface of the top surface of the piston main body, and the heat insulating layer is formed only on the other portion of the top surface of the piston main body.

According to the internal combustion engine of PTL 1, since the heat insulating layer is not formed on the squish area surface, the heat radiation from the end gas to the squish area surface is promoted, and the generation of the knocking is suppressed.

CITATION LIST

Patent Literature

PTL 1: Japanese Laid-Open Patent Application Publication No. 2011-169232

SUMMARY OF INVENTION

Technical Problem

According to the configuration of PTL 1, the generation of the knocking in the squish area can be suppressed. However, from the viewpoint of a reduction in the cooling loss, it is desirable that the heat insulating layer be formed on the entire top surface, including the squish area surface, of the piston main body.

An object of the present invention is to, while forming a heat insulating layer on a squish area surface, prevent generation of large cracks on the heat insulating layer by generation of knocking, and suppress damages and peeling of the heat insulating layer.

Solution to Problem

To achieve the above object, in the present invention, the heat insulating layer on the squish area surface of the top surface of the piston main body is made thinner than the heat insulating layer on a cavity surface of the top surface of the piston main body.

To be specific, a heat insulation structure of a combustion chamber of an engine disclosed herein is configured such that a heat insulating layer is provided on a top surface of a piston main body defining the combustion chamber of the engine, wherein: the top surface of the piston main body includes a cavity surface forming a cavity of the combustion chamber and a squish area surface forming a squish area of the combustion chamber; and a thickness of the heat insulating layer provided on the squish area surface is 5% or more and 50% or less of a thickness of the heat insulating layer provided on the cavity surface.

Originally, the heat insulation property of the heat insulating layer increases as the thickness of the heat insulating layer increases. However, in a case where cracks are generated by an influence of knocking on the heat insulating layer formed on the squish area surface, the cracks become deeper as the thickness of heat insulating layer increases, and the sizes of the cracks increase.

As the sizes of the cracks increase, the damages of the heat insulating layer increase, and the heat insulating layer is easily peeled from such damaged portion.

According to the present invention, the heat insulating layer having an adequate thickness is formed on the cavity surface which requires the high heat insulation property, and the heat insulating layer having a thickness that is half or less the thickness of the heat insulating layer on the cavity surface is formed on the squish area surface. With this, while obtaining the excellent heat insulation property over the entire top surface of the piston main body, the growth of the cracks generated on the heat insulating layer on the squish area surface can be suppressed, and the damages and peeling of the heat insulating layer can be suppressed.

It is preferable that the heat insulating layer include: a large number of spherical hollow particles; and a binder that holds the hollow particles on the top surface of the piston main body and fills spaces among the hollow particles to form a base material of the heat insulating layer. With this, the heat insulation property of the heat insulating layer can be effectively improved.

It is preferable that the binder be silicone-based resin. With this, the thermal conductivity of the heat insulating layer can be reduced, and excellent adhesion between the top surface of the piston main body and the heat insulating layer can be obtained.

It is preferable that the hollow particles be glass balloons. With this, the thermal conductivity of the heat insulating layer can be reduced, and the strength of the heat insulating layer can be improved.

It is preferable that: the thickness of the heat insulating layer provided on the cavity surface be 60 μm or more and 100 μm or less; and the thickness of the heat insulating layer provided on the squish area surface be 30 μm or more and 50 μm or less. With this, while obtaining the excellent heat insulation property over the entire top surface of the piston main body, the damages and peeling of the heat insulating layer can be effectively suppressed.

It is preferable that the thickness of the heat insulating layer provided on the squish area surface gradually decrease toward an end portion of the squish area surface which portion is located at an outer edge side of the combustion chamber. With this, while obtaining the excellent heat insulation property over the entire top surface of the piston main body, the damages and peeling of the heat insulating layer can be effectively suppressed.

Advantageous Effects of Invention

As described above, according to the present invention, while obtaining the excellent heat insulation property over the entire top surface of the piston main body, the growth of the cracks generated on the heat insulating layer on the squish area surface can be suppressed, and the damages and peeling of the heat insulating layer can be suppressed.

DESCRIPTION OF EMBODIMENTS

Hereinafter, embodiments of the present invention will be explained in detail based on the drawings. Explanations of preferred embodiments below are essentially mere examples, and are not intended to limit the present invention, the application of the present invention, or the use of the present invention.

Configuration of Engine

Figure 1:
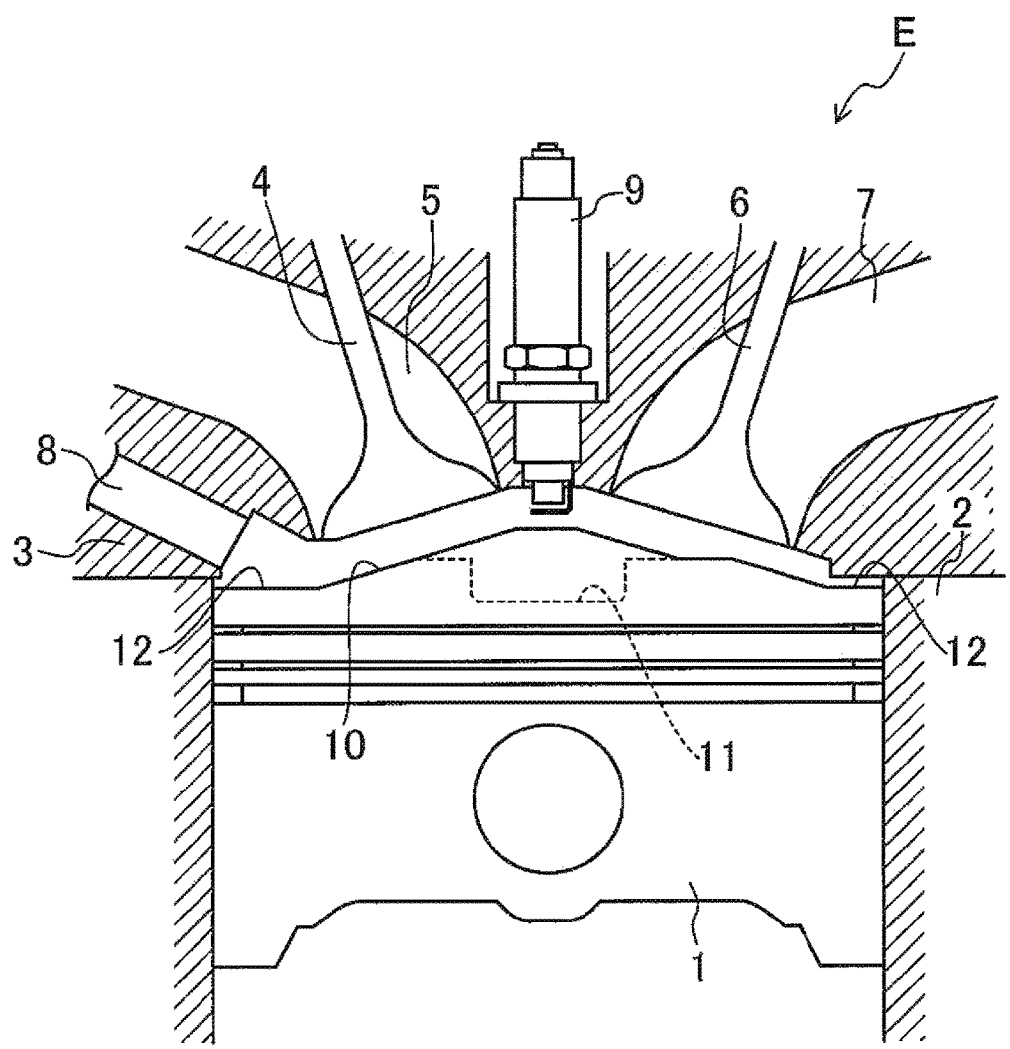
FIG. 1 is a sectional view schematically showing an engine according to one embodiment of the present invention.

A direct injection engine E shown in FIG. 1 includes: a piston 1; a cylinder block 2; a cylinder head 3; an intake valve 4 configured to open and close an intake port 5 of the cylinder head 3; an exhaust valve 6 configured to open and close an exhaust port 7 of the cylinder head 3; an injector 8; and a spark plug 9. The piston 1 reciprocates in a cylinder bore of the cylinder block 2.

Figure 2:
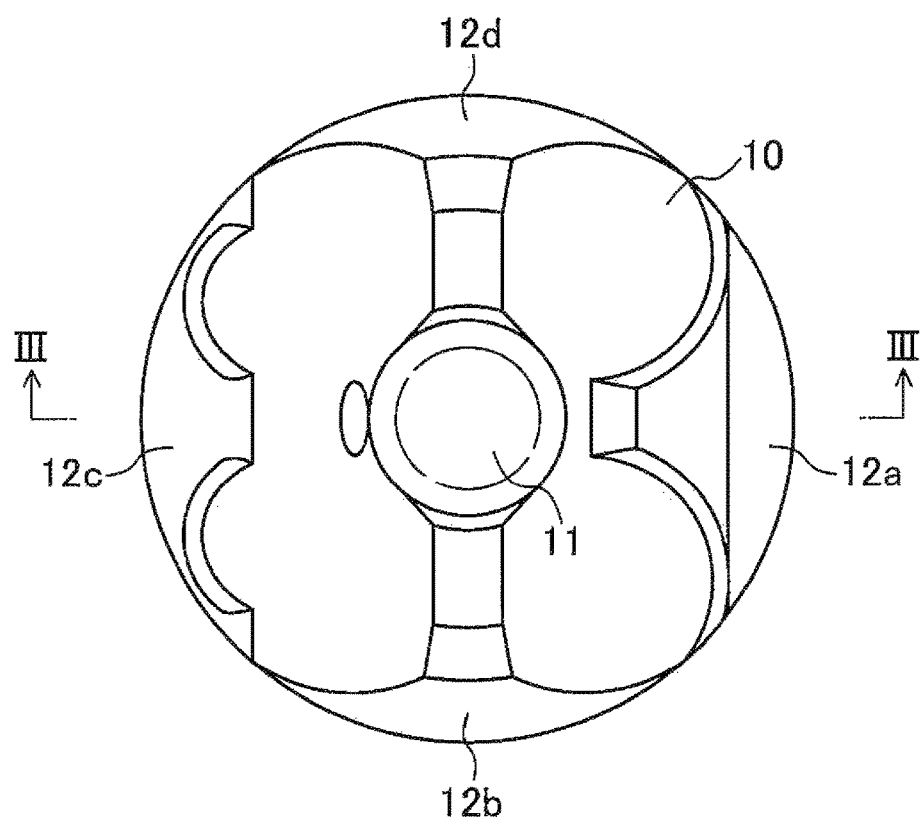
FIG. 2 is a plan view showing a crown surface of a piston according to the embodiment of FIG. 1.

A combustion chamber of the engine is formed by: a crown surface 10 of the piston 1; the cylinder block 2; the cylinder head 3; and umbrella portion front surfaces (surfaces facing the combustion chamber) of the intake and exhaust valves 4 and 6. As shown in FIGS. 1 and 2, a recessed cavity portion 11 forming a cavity of the combustion chamber is provided at a substantially middle portion of the crown surface 10 of the piston 1. A squish area portion 12 which forms a squish area exists at an outer edge side of the crown surface 10 which side is located away from the cavity of the combustion chamber. In the crown surface 10 of the piston 1 according to the present embodiment, the squish area portion 12 is formed by squish area portions 12a, 12b, 12c, and 12d.

Heat Insulating Layer

Figure 3:
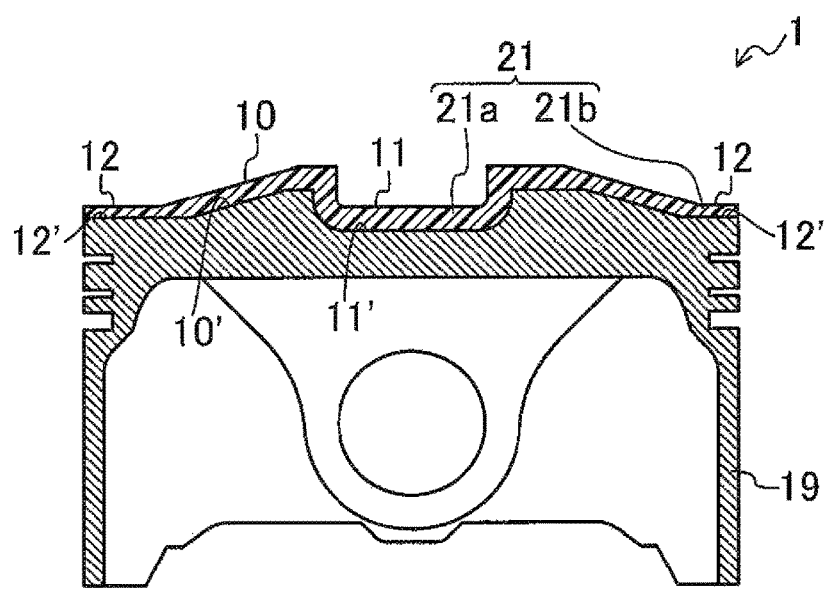
FIG. 3 is a longitudinal sectional view showing the piston of FIG. 2.

As shown in FIG. 3, the piston 1 includes: a piston main body 19 that is a base member of the piston 1; and a heat insulating layer 21 provided on a top surface of the piston main body 19 from the viewpoint of a reduction in cooling loss of the combustion chamber of the engine E.

The piston main body 19 is made of an aluminum alloy subjected to a T7 treatment or a T6 treatment. The top surface of the piston main body 19 includes: a cavity surface 11' constituting the cavity portion 11; and a squish area surface 12' constituting the squish area portion 12.

Figure 4:
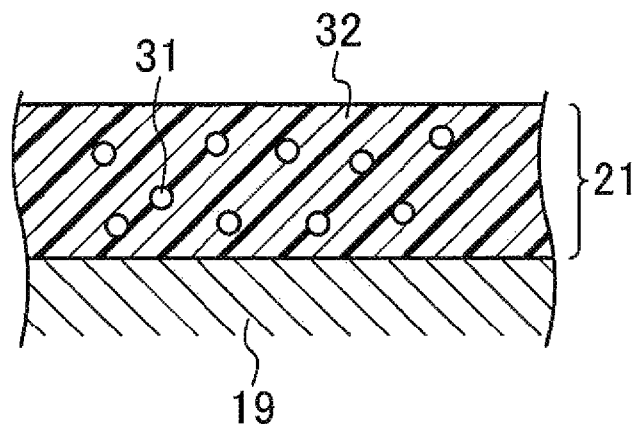
FIG. 4 is an enlarged sectional view showing a heat insulating layer of FIG. 3.

As shown in FIG. 4, the heat insulating layer 21 is a layer including hollow particles 31 and a binder material (binder) 32.

To be specific, the heat insulating layer 21 includes the binder material 32 and a large number of hollow particles 31 dispersed in the binder material 32. The binder material 32 holds the hollow particles 31 on the top surface of the piston main body 19 and fills spaces among the hollow particles 31 to form a base material of the heat insulating layer 21. The binder material 32 is, for example, a low thermally-conductive material, such as silicone-based resin, and internal spaces of the hollow particles 31 contain air that is low in thermal conductivity. Therefore, the heat insulating layer 21 is a layer having low thermal conductivity.

As the hollow particles 31, it is preferable to adopt ceramic-based hollow particles containing a Si-based oxide component (such as silica ($SiO_2$)) or an Al-based oxide component (such as alumina ($Al_2O_3$)), and examples thereof include silica balloons, glass balloons, shirasu balloons, fly ash balloons, and aerogel balloons. Especially, it is preferable to adopt glass balloons. Thus, the thermal conductivity of the heat insulating layer 21 can be reduced, and the strength of the heat insulating layer 21 can be improved.

The hollow particles 31 are preferably spherical. From the viewpoint of the improvement of the heat insulating property of the heat insulating layer 21, a mean diameter of the hollow particles 31 is preferably 5 μm or more and 50 μm or less, more preferably 10 μm or more and 45 μm or less, and especially preferably 15 μm or more and 40 μm or less. From the viewpoint of the improvement of the heat insulating property of the heat insulating layer 21, the amount of hollow particles 31 contained in the heat insulating layer 21 is preferably 5 mass % or more and 50 mass % or less, more preferably 10 mass % or more and 45 mass % or less, and especially preferably 15 mass % or more and 40 mass % or less.

Silicone-based resin that is a low thermally-conductive material can be used as the binder material 32. For example, silicone-based resin constituted by three dimensional polymer having high branching degree can be preferably used, and typical examples thereof include methyl silicone resin and methyl phenyl silicone resin. One specific example of the silicone-based resin is polyalkylphenylsiloxane. With this, the thermal conductivity of the heat insulating layer 21 can be reduced, and excellent adhesion between the top surface of the piston main body 19 and the heat insulating layer 21 can be realized.

The heat insulating layer 21 of the present embodiment is characterized in that a thickness of the heat insulating layer 21b provided on the squish area surface 12' is smaller than a thickness of the heat insulating layer 21a provided on the cavity surface 11'. Specifically, for example, the thickness of the heat insulating layer 21b of the squish area surface 12' is 5% or more and 50% or less of the thickness of the heat insulating layer 21a of the cavity surface 11', preferably 20% or more and 60% or less, more preferably 25% or more and 55% or less, and especially preferably 30% or more and 50% or less.

From the viewpoint of obtaining the excellent heat insulation property, it is desirable that the heat insulating layer 21 be thick. However, in the squish area, cracks may be generated on the heat insulating layer 21 by the generation of the above-described knocking. The thicker the heat insulating layer 21 is, the deeper the cracks become. With this, crack portions in the vicinity of the surface of the heat insulating layer 21 may spread. Then, the peeling of the heat insulating layer 21 occurs from the largely-grown cracked portion. Thus, the heat insulation property is lost.

According to the present configuration, the heat insulating layer 21a having an adequate thickness is formed on the cavity surface 11' which requires the high heat insulation property, and the heat insulating layer 21b having a thickness that is about half or less the thickness of the heat insulating layer 21a on the cavity surface 11' is formed on the squish area surface 12'. With this, while obtaining the excellent heat insulation property over the entire top surface of the piston main body 19, the cracks generated on the heat insulating layer 21b of the squish area surface 12' can be made small, and the damages and peeling of the heat insulating layer 21b can be suppressed.

From the viewpoint of obtaining the excellent heat insulation property, the thickness of the heat insulating layer 21a on the cavity surface 11' is preferably 40 μm or more and 150 μm or less, more preferably 50 μm or more and 120 μm or less, and especially preferably 60 μm or more and 100 μm or less.

From the viewpoint of preventing the damages and peeling of the heat insulating layer 21b while maintaining the high heat insulation property, the thickness of the heat insulating layer 21b on the squish area surface 12' is preferably 15 μm or more and 100 μm or less, more preferably 25 μm or more and 75 μm or less, and especially preferably 30 μm or more and 50 μm or less.

The thickness of the heat insulating layer 21 provided on the top surface other than the cavity surface 11' and the squish area surface 12' may be the same as the thickness of the heat insulating layer 21a on the cavity surface 11' or may be smaller than the thickness of the heat insulating layer 21a on the cavity surface 11' and larger than the thickness of the heat insulating layer 21b on the squish area surface 12'. For example, as shown in FIG. 3, the thickness of the heat insulating layer 21 provided on the top surface other than the cavity surface 11' and the squish area surface 12' may gradually decrease toward the squish area surface 12'. With this, the excellent heat insulation property can be obtained over the entire top surface of the piston main body 19.

Figure 5:
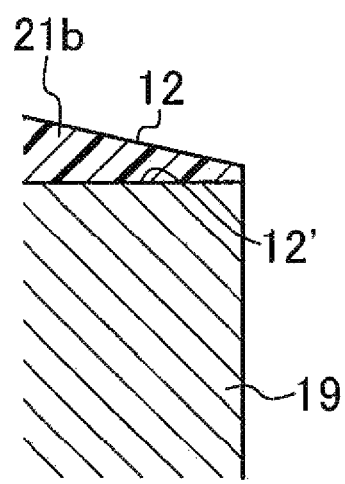
FIG. 5 is an enlarged sectional view showing the heat insulating layer provided on a squish area surface of a top surface of a piston main body according to another embodiment of the present invention.

Further, as shown in FIG. 5, the thickness of the heat insulating layer 21b on the squish area surface 12' may gradually decrease toward an end portion of the squish area surface 12' which portion is located at an outer edge side of the combustion chamber. With this, while obtaining the excellent heat insulation property over the entire top surface of the piston main body 19, the damages and peeling of the heat insulating layer 21 can be effectively suppressed.

Method of Forming Heat Insulating Layer

The piston main body 19 and a heat insulating material for forming the heat insulating layer 21 are prepared.

A recess for forming the cavity is formed on the top surface of the piston main body 19, and stains such as oil and fingerprints adhering to the top surface of the piston main body 19 are removed by a degreasing treatment.

Further, the heat insulating material is prepared by stirring and mixing liquid silicone resin as the binder material 32 and glass balloons as the hollow particles 31. Viscosity of the heat insulating material is adjusted by adding a thickener or a dilution solvent according to need.

To increase adhesion force between the piston main body 19 and the heat insulating material, especially the silicone resin, it is preferable that the top surface of the piston main body 19 be subjected to a surface roughening treatment. As the surface roughening treatment, it is preferable to perform a blast treatment such as sand blasting. For example, the blast treatment can be performed by an air blast device using alumina of particle size #30 as a grinding material under treatment conditions that are pressure of 0.39 MPa, a time of 45 seconds, and a distance of 100 mm. However, the surface roughing treatment is not limited to this. In a case where the piston main body 19 is made of an Al alloy, fine irregularities may be formed on the top surface of the piston main body 19 by an alumite treatment. For example, the alumite treatment may be performed by using an oxalic acid bath under treatment conditions that are a bath temperature of 20° C., a current density of 2 A/dm2, and a time of 20 minutes.

After that, the heat insulating material is applied to the top surface of the piston main body 19 by using a spray, a brush, or the like. Next, the applied heat insulating material is subjected to predrying by hot-air drying, an infrared heater, or the like.

The above application and predrying of the heat insulating material are repeated (re-application/re-predrying) according to need to obtain a desired application thickness.

In the present embodiment, the thickness of the heat insulating layer 21 on the cavity surface 11' of the piston main body 19 and the thickness of the heat insulating layer 21 on the squish area surface 12' of the piston main body 19 are different from each other. This is realized in such a manner that the number of times of the re-application/re-predrying of the heat insulating material on the cavity surface 11' is set to be larger than the number of times of the re-application/re-predrying of the heat insulating material on the squish area surface 12'.

Specifically, for example, after the re-application/re-predrying is performed a required number of times on the entire top surface of the piston main body 19, masking is performed only on the squish area surface 12', and the re-application/re-predrying is further performed a required number of times on the cavity surface 11' and the like other than the squish area surface 12'. It should be noted that the above masking can be performed by using a masking tape or a resin-based masking film. The above masking can be burnt out by a below-described baking treatment.

Further, in a case where the thickness of the heat insulating layer 21b on the squish area surface 12' gradually decreases toward the end portion located at the outer edge side of the combustion chamber, the direction of the spray may be controlled. Specifically, for example, the position and direction of a nozzle of the spray are set such that the heat insulating material is discharged from the cavity surface 11' side toward the squish area surface 12' side. With this, the amount of heat insulating material adhering becomes large at a position of the squish area surface 12' which position is close to the nozzle, that is, located at the cavity surface 11' side, and the amount of heat insulating material adhering becomes small at the end portion which is far from the nozzle, that is, located at the outer edge side of the combustion chamber. Thus, the heat insulating layer 21b which gradually decreases in thickness toward the end portion is obtained on the squish area surface 12'.

Next, the heat insulating material applied to the top surface of the piston main body 19 is subjected to, for example, a heat treatment at a temperature of about 180° C. for several hours to several tens of hours. With this, the silicone resin (binder) is cured, and the heat insulating layer 21 in which a large number of hollow particles 31 are densely filled and the binder material 32 is filled in the spaces among the particles is obtained.

One example of the method of applying the heat insulating material is that: the heat insulating material is placed on the top surface of the piston main body 19; and by using a molding die having a molding surface corresponding to the shape of the top surface of the piston main body 19, the heat insulating material is pressed against the piston top surface to spread on the entire top surface. In the present embodiment, the molding surface of the molding die may be formed such that the thickness of the heat insulating layer 21*b* on the squish area surface 12' becomes smaller than the thickness of the heat insulating layer 21*a* on the cavity surface. Further, as shown in FIG. 5, to form the heat insulating layer 21*b* that gradually decreases in thickness toward the end portion of the squish area surface 12', a portion of the molding die which portion corresponds to the squish area surface 12' may be provided with an inclination. According to this method, by heating the molding die during the molding, baking of the heat insulating layer 21 can be performed at the same time. With this, a process of producing the heat insulating layer 21 can be simplified. Further, when the baking of the heat insulating layer 21 is performed at the same time, the piston main body 19 may be cooled by, for example, a method of performing water cooling or air cooling from an inside of a piston skirt. With this, the adhesion between the heat insulating layer 21 and the top surface of the piston main body 19 can be improved.

INDUSTRIAL APPLICABILITY

According to the present invention, while forming the heat insulating layer on the squish area surface of the top surface of the piston main body, the generation of large cracks on the heat insulating layer can be prevented, and the damages and peeling of the heat insulating layer can be suppressed. Therefore, the present invention is extremely useful.

LIST OF REFERENCE CHARACTERS

1 piston
11' cavity surface
12' squish area surface
19 piston main body
21, 21*a*, 21*b* heat insulating layer
31 hollow particle
32 binder material (binder)
E engine

The invention claimed is:

1. A heat insulation structure of a combustion chamber of an engine,
the heat insulation structure being configured such that a heat insulating layer is provided on a top surface of a piston main body defining the combustion chamber of the engine, wherein:
the top surface of the piston main body includes a cavity surface forming a cavity of the combustion chamber and a squish area surface forming a squish area of the combustion chamber;
a thickness of the heat insulating layer provided on the squish area surface is 5% or more and 50% or less of a thickness of the heat insulating layer provided on the cavity surface; and
the thickness of the heat insulating layer provided on the squish area surface gradually decreases toward an end portion of the squish area surface, which portion is located at an outer edge side of the combustion chamber.

2. The heat insulation structure according to claim 1, wherein the heat insulating layer includes:
a large number of hollow particles; and
a binder that holds the hollow particles on the top surface of the piston main body and fills spaces among the hollow particles to form a base material of the heat insulating layer.

3. The heat insulation structure according to claim 2, wherein the binder is silicone-based resin.

4. The heat insulation structure according to claim 2, wherein the hollow particles are glass balloons.

5. The heat insulation structure according to claim 1, wherein:
the thickness of the heat insulating layer provided on the cavity surface is 60 μm or more and 100 μm or less; and
the thickness of the heat insulating layer provided on the squish area surface is 30 μm or more and 50 μm or less.

6. The heat insulation structure according to claim 3, wherein the hollow particles are glass balloons.

7. The heat insulation structure according to claim 2, wherein:
the thickness of the heat insulating layer provided on the cavity surface is 60 μm or more and 100 μm or less; and
the thickness of the heat insulating layer provided on the squish area surface is 30 μm or more and 50 μm or less.

8. The heat insulation structure according to claim 3, wherein:
the thickness of the heat insulating layer provided on the cavity surface is 60 μm or more and 100 μm or less; and
the thickness of the heat insulating layer provided on the squish area surface is 30 μm or more and 50 μm or less.

9. The heat insulation structure according to claim 4, wherein:
the thickness of the heat insulating layer provided on the cavity surface is 60 μm or more and 100 μm or less; and
the thickness of the heat insulating layer provided on the squish area surface is 30 μm or more and 50 μm or less.

10. The heat insulation structure according to claim 6, wherein:
the thickness of the heat insulating layer provided on the cavity surface is 60 μm or more and 100 μm or less; and
the thickness of the heat insulating layer provided on the squish area surface is 30 μm or more and 50 μm or less.

11. A heat insulation structure of a combustion chamber of an engine,
the heat insulation structure being configured such that a heat insulating layer is provided on a top surface of a piston main body defining the combustion chamber of the engine, wherein:
the top surface of the piston main body includes:
a cavity surface forming a cavity of the combustion chamber,
a squish area surface forming a squish area of the combustion chamber, and
an inclined surface located between the cavity surface and the squish area surface and inclined so as to become lower toward the squish area surface;

a thickness of the heat insulating layer provided on the squish area surface is smaller than a thickness of the heat insulating layer provided on the cavity surface; and a thickness of the heat insulating layer provided on the inclined surface is equal to the thickness of the heat insulating layer provided on the cavity surface, or the thickness of the heat insulating layer provided on the inclined surface is smaller than the thickness of the heat insulating layer provided on the cavity surface and larger than the thickness of the heat insulating layer provided on the squish area surface.

12. The heat insulation structure according to claim 11, wherein the heat insulating layer includes:

a large number of hollow particles; and a binder that holds the hollow particles on the top surface of the piston main body and fills spaces among the hollow particles to form a base material of the heat insulating layer.

13. The heat insulation structure according to claim 12, wherein the binder is silicone-based resin.

14. The heat insulation structure according to claim 12, wherein the hollow particles are glass balloons.

15. The heat insulation structure according to claim 11, wherein:

the thickness of the heat insulating layer provided on the cavity surface is 60 µm or more and 100 µm or less; and the thickness of the heat insulating layer provided on the squish area surface is 30 µm or more and 50 µm or less.

16. The heat insulation structure according to claim 11, wherein the thickness of the heat insulating layer provided on the squish area surface gradually decreases toward an end portion of the squish area surface, which portion is located at an outer edge side of the combustion chamber.

* * * * *